(12) United States Patent
Luly et al.

(10) Patent No.: US 10,280,082 B2
(45) Date of Patent: May 7, 2019

(54) PROCESS TO RECOVER HYDROGEN FLUORIDE FROM HYDROGEN FLUORIDE-POLYMER COMPOSITIONS

(71) Applicant: Honeywell International Inc., Morris Plains, NJ (US)

(72) Inventors: Matthew H. Luly, Hamburg, NY (US); Bernard E. Pointner, Buffalo, NY (US)

(73) Assignee: Honeywell International Inc., Morris Plains, NJ (US)

( * ) Notice: Subject to any disclaimer, the term of this patent is extended or adjusted under 35 U.S.C. 154(b) by 1 day.

(21) Appl. No.: 15/718,768

(22) Filed: Sep. 28, 2017

(65) Prior Publication Data

US 2018/0093891 A1 Apr. 5, 2018

Related U.S. Application Data

(60) Provisional application No. 62/403,988, filed on Oct. 4, 2016.

(51) Int. Cl.
| | | |
|---|---|---|
| *C01B 7/19* | (2006.01) | |
| *B01J 20/26* | (2006.01) | |
| *B01J 20/34* | (2006.01) | |
| *B01J 39/20* | (2006.01) | |
| *C08J 3/24* | (2006.01) | |

(Continued)

(52) U.S. Cl.
CPC ............. *C01B 7/198* (2013.01); *B01J 20/267* (2013.01); *B01J 20/3425* (2013.01); *B01J 20/3475* (2013.01); *B01J 39/20* (2013.01); *C08J 3/24* (2013.01); *C08K 3/16* (2013.01);
(Continued)

(58) Field of Classification Search
CPC ......... B82Y 30/00; B82Y 40/00; C01B 33/02; C01B 33/021; C01B 7/198; C01P 2004/20; C01P 2006/32; C01P 2006/40; H01L 35/32; H01L 35/34; Y10S 977/755; Y10S 977/888; Y10S 977/89; Y10S 977/948; B01J 20/267; B01J 20/3425; B01J 20/3475; B01J 39/20; C03C 15/00; C08J 2333/26; C08J 3/24; C08K 3/16; C09K 13/08
USPC ................. 216/40, 41, 45, 83, 99, 103, 108; 438/745, 750, 754
See application file for complete search history.

(56) References Cited

U.S. PATENT DOCUMENTS 1,470,772 A 10/1923 Simon
3,635,836 A 1/1972 Mullen
(Continued)

FOREIGN PATENT DOCUMENTS

WO 1997032810 A1 9/1997

OTHER PUBLICATIONS

International Search Report and Written Opinion issued in PCT/US2017/054864, dated Jan. 3, 2018, 10 pages.
(Continued)

*Primary Examiner* — Lan Vinh
(74) *Attorney, Agent, or Firm* — Faegre Baker Daniels LLP

(57) ABSTRACT

A method of preparing aqueous hydrogen fluoride is provided. The method includes providing a composition including a cross-linked polymer with absorbed hydrogen fluoride. The cross-linked copolymer includes acrylamide units and acrylic acid salt units. The method further includes contacting the composition with water to release at least a portion
(Continued)

of the hydrogen fluoride from the composition to the water to form the aqueous hydrogen fluoride.

20 Claims, 1 Drawing Sheet

(51) Int. Cl.
    *C08K 3/16*         (2006.01)
    *C09K 13/08*      (2006.01)
    *C03C 15/00*      (2006.01)

(52) U.S. Cl.
    CPC .............. *C09K 13/08* (2013.01); *C03C 15/00* (2013.01); *C08J 2333/26* (2013.01)

(56) References Cited

U.S. PATENT DOCUMENTS

| | | | |
|---|---|---|---|
| 4,383,868 A | 5/1983 | Braley | |
| 5,766,483 A * | 6/1998 | Luly | C01B 7/195 |
| | | | 210/670 |
| 6,177,058 B1 * | 1/2001 | Singh | C01B 7/191 |
| | | | 206/0.6 |
| 7,914,761 B2 | 3/2011 | Luly et al. | |
| 8,153,096 B2 | 4/2012 | Luly et al. | |
| 2002/0063106 A1 * | 5/2002 | Luly | C03C 15/00 |
| | | | 216/2 |
| 2006/0054325 A1 | 3/2006 | Brown et al. | |
| 2011/0152432 A1 * | 6/2011 | Luly | C08K 3/16 |
| | | | 524/438 |
| 2012/0056126 A1 * | 3/2012 | Miyashita | C09K 13/08 |
| | | | 252/79.3 |
| 2015/0203424 A1 | 7/2015 | Okamoto et al. | |
| 2016/0107892 A1 | 4/2016 | Wang et al. | |

OTHER PUBLICATIONS

Buchholz et al., "Modern Superabsorbent Polymer Technology", pp. 178-183 (1998).

* cited by examiner

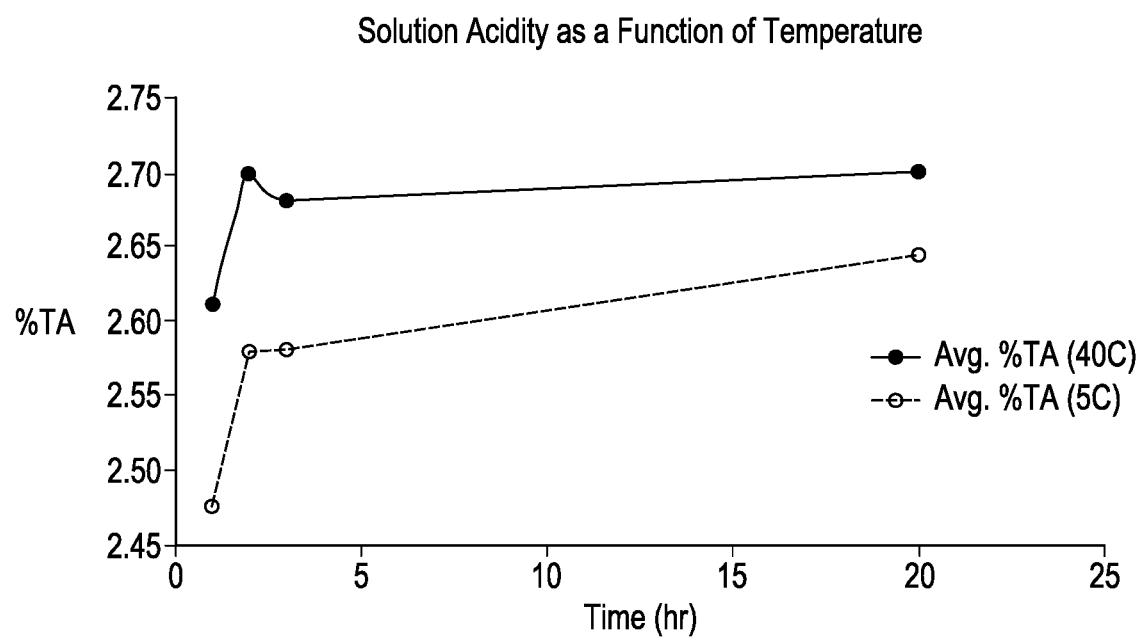

PROCESS TO RECOVER HYDROGEN FLUORIDE FROM HYDROGEN FLUORIDE-POLYMER COMPOSITIONS

CROSS-REFERENCE TO RELATED APPLICATION

This application claims priority to U.S. Provisional Patent Application Ser. No. 62/403,988, entitled PROCESS TO RECOVER HYDROGEN FLUORIDE FROM HYDROGEN FLUORIDE-POLYMER COMPOSITIONS, filed on Oct. 4, 2016, which is herein incorporated by reference in its entirety.

FIELD

The present disclosure relates to hydrogen fluoride compositions, and more particularly to methods of recovering hydrogen fluoride from hydrogen fluoride-polymer compositions.

BACKGROUND

Hydrogen fluoride is a well-known compound that is used in industry in a variety of processes including in alkylation reactions as a catalyst, in fluorination reactions as a fluorinating agent, in the manufacture of fluorides, in the separation of uranium isotopes, in the production of fluorine containing plastics, and in etching and cleaning applications. It is well known that hydrogen fluoride is a volatile, extremely hazardous substance the high vapor pressure of which renders it readily aerosolizable.

In an attempt to diminish the hazards of hydrogen fluoride, it has been combined with a variety of substances. U.S. Pat. No. 1,470,772 discloses a glass etching paste of mucilage, sulfuric acid, and ammonium fluoride in which the hydrogen fluoride is formed in situ. U.S. Pat. No. 3,635,836 discloses dispersions of hydrogen fluoride, particulate proteinaceous material and a small amount of carboxyl substituted vinyl polymers useful as pickling agents, plumbing cleaners and paint removers. U.S. Pat. No. 4,383,868 discloses a method of treating anhydrous hydrogen fluoride spills by applying a particulate mixture of polyacrylamide and a polyalkyl(alk)acrylate to the surface of the spill. However, none of these compositions provides an intimate mixture of hydrogen fluoride and a substance that both reduces the hazards of hydrogen fluoride and, at the same time, permits the ready recovery of the hydrogen fluoride from the composition.

To overcome these problems, it has been suggested to provide a mixture of hydrogen fluoride and water-soluble polymer. For example, U.S. Pat. No. 6,177,058 describes gelatinous mixtures of hydrogen fluoride (HF) and sodium polyacrylate or polyacrylamide. U.S. Pat. Nos. 7,914,761 and 8,153,096 describe mixtures of hydrogen fluoride and a polyacrylate-polyacrylamide cross-linked polymer.

Improvements in the foregoing processes and compositions are desired.

SUMMARY

The present disclosure provides methods of recovering hydrogen fluoride from hydrogen fluoride-polymer compositions.

A method of preparing aqueous hydrogen fluoride is provided. The method includes providing a composition including a cross-linked polymer with absorbed hydrogen fluoride, wherein the cross-linked copolymer includes acrylamide units and acrylic acid salt units. The method further includes contacting the composition with water, whereby at least a portion of the hydrogen fluoride transfers from the composition to the water to form the aqueous hydrogen fluoride. In a more particular embodiment, the method also includes mixing the hydrogen fluoride and the cross-linked copolymer to form the composition.

In a more particular embodiment of any of the above embodiments, the method further includes removing the cross-linked polymer from the aqueous hydrogen fluoride and contacting the cross-linked polymer with hydrogen fluoride to provide a second composition including the cross-linked polymer with absorbed hydrogen fluoride. In a further embodiment, the method also includes contacting the second composition with water, whereby at least a portion of the hydrogen fluoride transfers from the second composition to the water to form aqueous hydrogen fluoride.

In a more particular embodiment of any of the above embodiments, at least 60 wt. %, even more particularly at least 80 wt. %, and still more particularly at least 90 wt. % of the hydrogen fluoride from the composition transfers to the water.

In a more particular embodiment, the method includes etching a siliceous substrate with the aqueous hydrogen fluoride.

In one more particular embodiment of any of the above embodiments, the acrylamide units are polyacrylamide units. In another more particular embodiment of any of the above embodiments, the acrylate acid salt is selected from the group consisting of potassium acrylate, sodium acrylate, and ammonium acrylate, or even more particularly, the acrylate acid salt is potassium acrylate. In one more particular embodiment of any of the above embodiments, the cross-linked polymer is a cross-linked acrylamide/potassium acrylate copolymer. In one more particular embodiment of any of the above embodiments, the copolymer has a weight average molecular weight of about 5,000 to about 5,000,000 Daltons.

In one more particular embodiment, at least a portion of the hydrogen fluoride is released from the composition at a temperature greater than about 5° C., and even more particularly, at a temperature of about 40° C. or greater.

In a more particular embodiment of any of the above embodiments, the composition comprises anhydrous hydrogen fluoride.

The above mentioned and other features of the invention, and the manner of attaining them, will become more apparent and the invention itself will be better understood by reference to the following description of embodiments of the invention taken in conjunction with the accompanying drawings.

BRIEF DESCRIPTION OF THE DRAWINGS

FIG. 1 is related to the Examples and illustrates the solution acidity as a function of temperature.

DETAILED DESCRIPTION

The present disclosure is directed to the recovery of hydrogen fluoride and a polyacrylate-polyacrylamide cross-linked polymer.

The present disclosure provides solid and semi-solid compositions comprising hydrogen fluoride compositions that facilitate the safe use, transport, and storage of hydrogen fluoride. Further, the chemical properties of the hydrogen fluoride in the compositions of the present disclosure are substantially unchanged from those of hydrogen fluoride in its pure state and, thus, hydrogen fluoride may be readily and quantitatively recovered from the compositions.

In certain embodiments of the disclosure, compositions are provided including intimate mixtures of hydrogen fluoride and an effective amount of a polyacrylate/polyacrylamide crossed-linked copolymer. These mixtures preferably are solid or semi-solid (e.g., gelatinous).

As used herein, "aqueous hydrogen fluoride" means a mixture of water and hydrogen fluoride. Aqueous hydrogen fluoride is contrasted with pure water and pure hydrogen fluoride, also referred to as anhydrous hydrogen fluoride.

As used herein, "anhydrous hydrogen fluoride" means a substantially pure composition of hydrogen fluoride.

As used herein, the term "copolymer" means a polymer having two or more different monomer residues that have been polymerized and constructed as one or more chains. The arrangements of these monomer units in the chain include those that regularly alternate the different monomers or those that repeat monomer units in regular or random sequences. In addition, the chain can be straight, branched, or grafted, or can exist as a block copolymer.

As used herein, the term "cross-linked" means the attachment of two chains of polymer molecules by bridges composed of an element, a functional group, a compound, or a polymer unit, which join certain atoms of the chains by primary chemical bonds. In certain embodiments, cross-linking occurs between two or more polymer chains to form a copolymer structure. In certain other embodiments, cross-linking occurs between two or more copolymer chains that are similar in arrangement, such as between amide groups and carboxylic groups of the copolymer.

In some exemplary embodiments, the cross-linked copolymer of the present disclosure in its dry form is solid, such as in the form of a powder, granules, pellets, fiber, fabrics, mats, and pads and the like. When exposed to hydrogen fluoride, the copolymer chains expand or unfold and uptake or absorb hydrogen fluoride to form a solid or a semi-solid material, such as a gel. Due to the cross-linking of the copolymer, the copolymer is insoluble in hydrogen fluoride and water.

Though not intending to be bound by a particular theory, it is believed that hydrogen fluoride uptake by the copolymer is facilitated by the negatively charged carboxylic groups of the copolymer and their solvation with hydrogen fluoride molecules. For embodiments in which the copolymer includes an alkali metal or ammonium ion (e.g., copolymers formed with an acrylic acid salt), it is believed that, in the presence of hydrogen fluoride, the alkali metal or ammonium disassociates from the carboxyl group creating two ions: a carboxyl (COO—) and an alkali metal or ammonium ion (e.g., Na+). The carboxyl groups begin to repel each other because they have the same negative charge. This repulsion unfolds or swells the polymer chain. The swelling action also allows more hydrogen fluoride to associate with the polymer chain and reside in the spaces within the polymer's network. The ions are also likely to associate with the hydrogen fluoride. The hydrogen of the hydrogen fluoride or water interacts with negative carboxyl anions. Similarly, the fluoride of the hydrogen fluoride and oxygen of water interacts with the alkali metal or ammonium ion of the polymer. Furthermore, HF is also known to form complexes with amines and the nitrogen groups in the polymer may also facilitate uptake of HF by the polymer.

The cross-linking between polymer chains prevents the copolymer from dissolving in liquid hydrogen fluoride or other liquids. When the chains become solvated, the cross links prevent them from moving around randomly. In general, the cross-linking affects the copolymer's absorption capacity, with more cross links in a chain corresponding to a decrease in the polymer's ability to absorb liquids.

In some exemplary embodiments, the cross-linked copolymers of the present disclosure are constructed of both acrylamide units and acrylate units. Within the scope of the term "acrylamide", included is acrylamide itself (i.e., 2-propenamide), polyacrylamides, polyalkylacrylamides (e.g., polymethylacrylamide), monomer residues of such acrylamides, and derivatives thereof. As used herein, the term "derivative" means a compound or chemical structure having the same fundamental structure or underlying chemical basis as the relevant related compound. Such a derivate is not limited to a compound or chemical structure produced or obtained from the relevant related compound. Acrylamide units that can be utilized in the present disclosure include individual structural units of acrylamide, repeating units of acrylamide, and polymer chains constructed, at least in part, of acrylamides.

Within the scope of the term "acrylate", included is acrylic acid (i.e., 2-propenoic acid), acrylic acid salt (e.g., sodium acrylate, potassium acrylate, and the like), alkylacrylates (e.g. methyl acrylate, butyl methylacrylate, and the like), polyacrylates, polyalkylacrylates, polyacrylic salts, monomer residues of such acrylates, and derivatives thereof. Acrylate units that can be utilized in the present disclosure include individual structural units of acrylates, repeating units of acrylates, and polymer chains constructed, at least in part, of acrylates.

Exemplary acrylic acid salts include potassium acrylate, sodium acrylate, and ammonium acrylate. In some exemplary embodiments, the acrylic acid salt is potassium acrylate.

Polyacrylate-polyacrylamide cross-linked copolymers are commercially available from a variety of sources including Degussa AG of Krefeld, Germany (sold under the trade name STOCKOSORB®), Kyoritsu Yukikogyo Kenkyusho of Japan (sold under the trade name Hymosab® 200), and Aldrich of Milwaukee, Wis. (Cat. No. 43, 277-6).

In some exemplary embodiments, copolymers of the present disclosure comprise as little as 1 wt. %, 5 wt. %, 10 wt. %, or 20 wt. %, or as great as 50 wt. %, 60 wt. %, 80 wt. %, or 99 wt. % of acrylamide units based upon the total weight of the copolymer, or within any range defined between any two of the foregoing values, such as 1 wt. % to 99 wt. % or 5 wt. % to 60 wt. %, for example.

In some exemplary embodiments, copolymers of the present disclosure comprise as little as 1 wt. %, 5 wt. %, 10 wt. %, or 20 wt. %, or as great as 50 wt. %, 60 wt. %, 80 wt. %, or 99 wt. % of acrylate units based upon the total weight of the copolymer, or within any range defined between any two of the foregoing values, such as 1 wt. % to 99 wt. % or 5 wt. % to 60 wt. %, for example.

In some exemplary embodiments, the cross-linked copolymers have a weight average molecular weight (Mw) as little as about 5,000 Daltons, 10,000 Daltons, or 100,000 Daltons, or as great as 1,000,000 Daltons, 5,000,000 Daltons, or 10,000,000 Daltons, or within any range defined between any two of the foregoing values, such as from 5,000 Daltons to 10,000,000 Daltons or 5,000 Daltons to 5,000,000 Daltons, for example. Weight average molecular weight (Mw) may be determined by gel permeation chromatography (GPC), in which the polymer is dissolved and run with a carrier fluid through a column which separates the various molecular weight components which are then detected with an appropriate detector at the exit of the column.

To prepare the compositions of the disclosure, an effective amount of a cross-linked copolymer is mixed with hydrogen fluoride in any suitable corrosion resistant vessel to form an intimate mixture. An effective amount of cross-linked copolymer is an amount capable of decreasing the volatility and increasing the surface tension of the hydrogen fluoride to the level desired for the end use. Alternatively, hydrogen fluoride may be added to an amount of cross-linked copolymer capable of absorbing the amount of added hydrogen fluoride. Addition of the cross-linked copolymer and hydrogen fluoride may be performed in any sequence. Mixing may be accomplished by any means convenient, including without limitation, stirring or dispersing the copolymer into a pool of hydrogen fluoride or passing hydrogen fluoride gas over the cross-linked copolymer.

The hydrogen fluoride may be commercially available anhydrous hydrogen fluoride having a water content of 0.05 wt. % or less, such as 0 wt. % or aqueous hydrogen fluoride having a water content as little as 0.06 wt. %, 0.15 wt. %, 0.5 wt. %, 0.6 wt. %, 1 wt. %, 2 wt. %, 3 wt. %, 5 wt. %, 10 wt. %, 12 wt. %, 25 wt. %, or 30 wt. %, or as great as 50 wt. %, 70 wt. %, 75 wt. %, 90 wt. %, 95 wt. %, 99 wt. %, 99.4 wt. %, 99.5 wt. %, or 99.9 wt. %, based on the total weight of water and hydrogen fluoride, or within any range defined between any two of the foregoing values, such as 0.06 wt. % to 99.9 wt. %, 0.06 wt. % to 90 wt. %, 50 wt. % to 99.9 wt. %, 0.06 wt. % to 30 wt. %, 1 wt. % to 30 wt. %, 2 wt. % to 30 wt. %, or 3 wt. % to 12 wt. %, for example.

The polymer may be in any form suitable for mixing with the hydrogen fluoride including, without limitation, granules, beads, pellets, fibers, or mats. Mixing will occur faster for smaller particle sizes of the polymer and slower for larger sizes. Typically mixing is performed at temperatures from about 0° C. to about 100° C., more particularly from about 10° C. to about 40° C., and even more particularly from about 10° C. to about 25° C. Pressure is not critical to the mixing operation, although capacity is generally lower at increased pressure.

The amount of hydrogen fluoride and cross-linked copolymer used will depend in part on the particular cross-linked copolymer selected and the desired end-use for the composition. If the cross-linked copolymer has a relatively low molecular weight, the resulting HF/cross-linked copolymer composition will be a viscous liquid. If the cross-linked copolymer has a relatively high molecular weight, the resulting composition will be a solid or semi-solid material (e.g., gel). Additionally, the amount of cross-linked copolymer used will determine whether or not the resulting composition is a solid or liquid. Generally, up to about 1 percent by weight, based on the total weight of the composition, of cross-linked copolymer is used the composition will be a viscous liquid. Compositions in which the amount of cross-linked copolymer is at least about 2 weight percent, generally, will take a gel-like semi-solid form.

It should be noted further that a higher weight percentage of cross-linked copolymer will lead to a greater the reduction in vapor pressure and an increase in surface tension. In certain embodiments, the reduction in surface tension will reduce hydrogen fluoride aerosolization. However, with an increase in weight percentage of cross-linked copolymer, the weight percentage of hydrogen fluoride in the composition decreases which may affect the composition's suitability for a desired end-use. Therefore, the effective amount of hydrogen fluoride and cross-linked copolymer used will depend on a consideration of a number of factors.

In some exemplary embodiments, the amount of cross-linked copolymer, based on the total weight of cross-linked copolymer and hydrogen fluoride, is as little as 0.5 wt. %, 1 wt. %, 2 wt. %, 5 wt. %, 10 wt. %, 25 wt. %, 40 wt. %, 45 wt. %, or 50 wt. %, or as great as 55 wt. %, 60 wt. %, 75 wt. %, 90 wt. %, 95 wt. %, 98 wt. %, 99 wt. %, 99.5 wt. %, or 99.9 wt. %, or within any range defined between any two of the foregoing values, such as from 0.5 wt. % to 99.9 wt. %, from 2 wt. % to 98 wt. %, from 25 wt. % to 75 wt. %, from 40 wt. % to 60 wt. %, or from 45 wt. % to 55 wt. %, for example.

It is possible to measure the capacity of a polymer for HF by mixing the polymer with an excess of HF, allowing the mixture to stand for a period of time such that the polymer becomes saturated, gravity or suction filtering off the excess HF, and weighing the saturated polymer as well as the excess HF.

It is contemplated therefore, that in addition to polyacrylate/polyacrylamide crossed-linked copolymers, other HF-absorbing polymers and copolymers may be practiced with the present disclosure. In some exemplary embodiments, these other polymers and copolymers will be mixed with the polyacrylate/polyacrylamide crossed-linked copolymer to optimize several properties of the composition. Examples of other polymers that may be mixed with a polyacrylate/polyacrylamide crossed-linked copolymer include those described in U.S. Pat. No. 6,177,058. Exemplary additional polymers include water soluble polymers selected from the group consisting of cellulose ethers, modified starches, starch derivatives, natural gum derivatives, polyacrylic acid salts, ethylene oxide polymer, methacrylic acid polymer, polyethyleneimine polymer, polyvinyl pyrrolidone polymer and mixtures thereof.

Without departing from the scope of the disclosure, it will be recognized that other components also may be included in the compositions of this disclosure. The specific nature of these components will depend on the desired end use of the compositions.

Hydrogen fluoride may be recovered readily from the HF/polymer composition of the disclosure by contacting the composition with water. In some exemplary embodiments, contacting the HF/polymer composition with water results in recovery of at least 50 wt. %, 60 wt. %, 70 wt. %, 75 wt. %, 80 wt. %, 85 wt. %, 90 wt. %, 95 wt. %, or about 100 wt. % of the hydrogen fluoride in the HF/polymer composition, or within any range defined between any two of the foregoing values, such as 50 wt. % to 100 wt. %, 60 wt. % to 95 wt. %, or 60 wt. % to 90 wt. %, for example.

Hydrogen fluoride, water, or a mixture of hydrogen fluoride and water may be recovered from the composition of the disclosure by treating the composition so as to liberate vapors of hydrogen fluoride, water, or a mixture of hydrogen fluoride and water. One means of treating the compositions in order to liberate hydrogen fluoride vapor is by heating the composition at elevated temperatures resulting in the liberation of vapors of hydrogen fluoride, water, or a mixture of hydrogen fluoride and water. The vapor may then be condensed by any convenient means. Alternatively, the hydrogen fluoride, water, or a mixture of hydrogen fluoride and water may be liberated by decreasing the pressure over the composition or increasing both the pressure and temperature and then condensing the vapors. As yet another alternative, hydrogen fluoride value may be recovered from the compositions by use of the compositions in any of the wide variety of processes that use hydrogen fluoride, such as those involving a HF catalyst, fluorinating agent, chemical synthesis, etching processes, and cleaning processes.

In a further embodiment, the cross-linked copolymer may be previously pretreated with hydrogen fluoride by contacting the cross-linked copolymer with hydrogen fluoride to absorb at least a portion of the hydrogen fluoride with the cross-linked copolymer, and then recovering at least a portion of the absorbed hydrogen fluoride from the cross-linked copolymer. In some exemplary embodiment, pretreating the cross-linked copolymer provides a higher rate of subsequent hydrogen fluoride recovery. In some exemplary embodiments, contacting a HF/pretreated cross-linked copolymer composition with water results in recovery of at least 80 wt. %, 85 wt. %, 90 wt. %, 95 wt. %, 98 wt. %, or about 100 wt. % of the hydrogen fluoride in the HF/polymer composition, or within any range defined between any two of the foregoing values, such as 90 wt. % to 100 wt. %, 95 wt. % to 100 wt. %, or 98 wt. % to 100 wt. % for example.

In some exemplary embodiments, the recovery is conducted at a temperature as little as 5° C., 10° C., 15° C., or 20° C., or as great as about 25° C., 30° C., 35° C., 40° C., or greater, or within any range defined between any two of the foregoing values, such as from 5° C. to 40° C., for example.

The compositions of the disclosure provide a convenient and safe method for storing hydrogen fluoride. Because the compositions exhibit little or no volatilization of hydrogen fluoride, the hazards of storing the hydrogen fluoride are significantly reduced. Further, the hydrogen fluoride may be recovered from the stored composition by the means described herein. Additionally, the stored material may be safely transported. The compositions of the disclosure may be prepared and then placed in a storage container by any convenient means. Alternatively, the compositions may be prepared in the storage container. Suitable storage containers are those containers made of, or lined with, a hydrogen fluoride resistant material such as carbon steel, fluoropolymers, MONEL®, and the like. Storage of the compositions may be for any length of time provided that the compositions are not exposed to air or other chemicals. In some exemplary embodiments, storage is under ambient conditions.

The stored composition may be safely and efficiently transported to a destination. Transporting of the composition may employ any conventional means such as rail car or truck. Once delivered to the destination, the stored composition may be treated to recover the hydrogen fluoride from the composition for use.

EXAMPLES

Example 1—Absorption Capacity of Pure Water

About 1 g of Stockosorb M polymer (acrylamide/potassium acrylate copolymer, cross-linked), was obtained from Degussa AG, of Krefeld, Germany, and placed into contact with 600 ml of deionized water. Its capacity for absorbing water was about 260 g $H_2O$/g polymer. Titration of the excess, unabsorbed water did not detect acidity.

Example 2—Absorption Capacity of Anhydrous HF

Approximately, 0.5 grams of Stockosorb M, was placed into a perfluoroalkoxy (PFA) vessel fitted with a screen above the polymer, and evacuated. The PFA vessel was then weighed, and cooled to about −78° C. About 29 grams of anhydrous HF were distilled onto the polymer. The PFA vessel was warmed to room temperature and weighed. After about two hours, the PFA vessel was inverted and the excess HF drained into a second, evacuated PFA vessel. The HF-polymer gel remained on the filter screen in the first PFA vessel. The vessel containing the polymer gel was again weighed and the polymer found to have absorbed about 45.6 grams of HF per gram of polymer. This experiment was repeated several times and the average capacity was found to be about 45.2 grams of anhydrous HF per gram of polymer. This shows a high capacity of the polymer for anhydrous HF.

Example 3

A 50/50 weight % HF/polymer composition was prepared by contacting 50 g of Stockosorb M with 50 g of anhydrous HF in a 130 mL PFA bottle. The mixture was placed in a 40° C. oven overnight to facilitate equilibration, then removed and cooled to room temperature. 12 g portions of the HF-polymer composition were then added to each of four 500 mL FEP bottles. 194 g of deionized water was then added to each of the four bottles. The samples were held at room temperature and the liquid in each bottle was sampled after 1 hour, 2 hours, 3 hours and 20 hours and titrated with a standard NaOH solution to measure total acidity. The average acidity is shown in Table 1. If all the HF left the polymer to form aqueous HF, the acidity would be about 3 weight %. Table 1 shows the acidity increases over time reaching 2.6 wt %.

Example 4

A 50/50 wt. % HF/polymer composition was prepared by contacting 20 g of Stockosorb M with 20 g of anhydrous HF in a 130 mL PFA bottle. The mixture was placed in a 40° C. oven overnight to facilitate equilibration, then removed and cooled to room temperature. 12 g portions of the HF-polymer composition were then added to each of three 500 mL FEP bottles. 194 g of deionized water was then added to each of the three bottles. The samples were returned to the 40° C. oven and the liquid in each bottle was sampled after 1 hour, 2 hours, 3 hours and 20 hours and titrated with a standard NaOH solution to measure total acidity. The average acidity is shown in Table 1. If all the HF left the polymer to form aqueous HF, the acidity would be about 3 wt. %. Table 1 shows the acidity increases over time reaching 2.6 wt. %

Example 5

Stockosorb M was saturated with anhydrous HF as in Example 2. The composition was drained of excess HF, heated up to 140° C. under vacuum to remove the reversibly bound HF. An approximately 50/50 weight % HF/polymer composition was prepared by contacting 41 g of the HF pretreated Stockosorb M with 40 g of anhydrous HF in a 130 mL PFA bottle. The mixture was placed in a 40° C. oven overnight to facilitate equilibration, then removed and cooled to room temperature. 12 g portions of the HF-polymer composition were then added to each of three 500 mL FEP bottles. 194 g of deionized water was then added to each of the three bottles. The samples were maintained at room temperature and the liquid in each bottle was sampled after 1 hour, 2 hours, 3 hours and 20 hours and titrated with a standard NaOH solution to measure total acidity. The average acidity is shown in Table 1. If all the HF left the polymer to form aqueous HF, the acidity would be about 3 wt. %. Table 1 shows the acidity increases over time reaching about 3.1 wt. %. Without wishing to be held to any particular theory, it is believed that the excess acidity in Example 5 is within experimental error of 100% recovery.

Example 6

Example 5 was repeated except after the water was added to the gel, the material was returned to a 40° C. oven. After 20 hours the liquid was 3.0 weight % acid. The results are shown in Table 1.

TABLE 1

Liquid weight % acid concentration summary as a function of time

| Time (hr) | Example 3 | Example 4 | Example 5 | Example 6 |
|---|---|---|---|---|
| 1 | 1.9% | 1.5% | 1.7% | 2.5% |
| 2 | 1.9% | 2.5% | 2.5% | 3.0% |
| 3 | 2.3% | 2.6% | 3.0% | 3.0% |
| 20 | 2.6% | 2.6% | 3.1% | 3.0% |

As shown in Table 1, the HF-polymer composition forms aqueous HF solutions, with the acidity increasing with time. If all the HF was liberated from the polymer to form aqueous HF, the concentration would be about 3 wt. % acid in each example. Examples 5 and 6 resulted in about 3 wt. % acid concentration after 20 hours, while Examples 3 and 4 resulted in a slightly lower acid concentration. Without wishing to be held to any particular theory, it is believed that upon the first exposure of the polymer to HF, a relatively small amount of HF irreversibly binds to the polymer. This is supported in Table 1, in which about 87% of the total acid (2.6 wt. %/3.0 wt. %) was recovered in Examples 3 and 4. Following an initial pretreatment with hydrogen fluoride, recoveries of about 100% of the total HF are possible in subsequent exposures to HF, as demonstrated in Examples 5 and 6.

Examples 7-9

Approximately 50/50 weight % HF/polymer compositions were prepared in a similar fashion to Example 3. Increasing amounts of this mixture were added to water in amounts such that if all the HF formed aqueous HF, the aqueous HF would have weight % compositions of 9.9%, 16.4%, and 23.6%, respectively. The acidities were measured after 20 hours at room temperature and are summarized in Table 2. The measured acidities were somewhat lower than the theoretical maximum. The results as shown in Table 2 support that most of the HF formed aqueous acid with water, but a relatively small amount remained irreversibly bound to the polymer.

TABLE 2

Summary of Examples 7-9

|  | Example 7 | Example 8 | Example 9 |
|---|---|---|---|
| Theoretical Maximum Wt % Acidity | 9.9% | 16.4% | 23.6% |
| Measured Wt % Acidity | 8.1% | 13.1% | 16.4% |

Example 10

A similar procedure to Example 5 was employed. Stockosorb M was saturated with anhydrous HF, which was subsequently removed with heat and vacuum. Using this pretreated polymer, an approximately 50/50 weight % HF/polymer composition was prepared. About 20 grams of this polymer was added to about 90 grams of deionized water. This sample was allowed to stand at room temperature for 20 hours and the liquid was titrated for total acid. The measured acidity was equal to the theoretical value of 10.3 wt. % acid.

Example 11

A procedure similar to Example 10 was employed using pretreated Stockosorb M. However, in this experiment the sample was allowed to stand at 40° C. for 20 hour. An acidity of 10.0 weight % was measured versus a theoretical maximum of 10.2 weight %.

Example 12

Example 3 was repeated and the HF-polymer plus water system allowed to stand at room temperature for several days. A microscope slide was placed in an FEP bottle in such a way that it leaned against the bottle wall and touched the bottle only at the very top and bottom of the slide. Enough of the HF-polymer plus water system was added to the FEP bottle such that the glass slide was half-immersed. After 19 hours, the slide was removed, rinsed and dried. It had been etched and lost about 18% of its starting weight, indicating that the acid solution produced from adding the HF-polymer composition to water makes aqueous HF, and that the aqueous hydrogen fluoride can be used to attack siliceous materials making it useful in etching and cleaning applications and as a raw material for chemical reactions.

Example 13

An approximately 80/20 weight % HF/polymer composition was prepared in a similar fashion to Example 3. Five grams of this material was added to 10 grams of water. The theoretical maximum concentration of HF in the resulting solution was 28.9 weight %. After 22 hours, the measured acidity was 24.0 weight % indicating most of the HF formed aqueous acid with water, but a small amount remained irreversibly bound to the polymer.

Example 14

An approximately 95/5 weight % HF/polymer composition was prepared in a similar fashion to Example 3. 19.4 grams of this material was added to 10.1 grams of water. The theoretical maximum concentration of HF in the resulting solution was 64.6 weight %. After 17 hours, the measured acidity was 56.4 weight % indicating most of the HF formed aqueous acid with water, but a small amount remained irreversibly bound to the polymer.

Example 15

A sample of Stockosorb M was saturated with anhydrous HF giving an approximately 97.6 weight % HF/2.4 weight % polymer composition. About 39.9 grams of this material was added to 40.32 grams of deionized water. After 20 hours the solution was determined to be 43.2 weight % acid versus a theoretical maximum of 49.1 weight % HF.

Example 16

A sample of Stockosorb M was saturated with a 49 weight % aqueous solution of HF. A 12.5 g sample of this material was added to about 194 g of water. Because the capacity of the polymer is lower for aqueous HF than anhydrous HF, the theoretical maximum concentration of HF in this solution was only 2.76 weight % HF. After 24 hours the solution was analyzed and determined to be 2.42 weight % acid.

Example 17

Example 16 was repeated. The resulting solution had a theoretical maximum concentration of 2.71 weight % HF. After 24 hours the solution was analyzed and determined to be 2.36 weight % HF.

Example 18

Approximately 20 g of untreated Stockosorb M was mixed with approximately 20 g of anhydrous HF and allowed to stand overnight. Two approximately 12 g samples of the recovered gel (50 wt. % HF) were then transferred to two reaction vessels and approximately 194 g of $H_2O$ was added to each vessel. One of the samples was stored at 5° C. and the other at 40° C. and aliquots of the solutions were taken at 1, 2, 3, and 20 hrs. The results are presented in FIG. 1, where the lower curve illustrates the results at 5° C. and the upper curve illustrates the results at 40° C. It was determined that the sample stored at 40° C. had a higher overall % total acidity over time indicating that the sample stored at higher temperature released HF more quickly than the sample stored at lower temperature.

While this invention has been described as relative to exemplary designs, the present invention may be further modified within the spirit and scope of this disclosure. Further, this application is intended to cover such departures from the present disclosure as come within known or customary practice in the art to which this invention pertains.

The invention claimed is:

1. A method of preparing aqueous hydrogen fluoride comprising:
providing a composition including a cross-linked polymer with absorbed hydrogen fluoride, the cross-linked copolymer including acrylamide units and acrylic acid salt units; and
contacting the composition with water, to release at least a portion of the hydrogen fluoride from the composition to the water to form the aqueous hydrogen fluoride.

2. The method of claim 1, wherein the absorbed hydrogen fluoride comprises anhydrous hydrogen fluoride.

3. The method of claim 1, further comprising mixing anhydrous hydrogen fluoride and the cross-linked copolymer to form the composition including the cross-linked polymer with absorbed hydrogen fluoride.

4. The method of claim 1, further comprising mixing aqueous hydrogen fluoride and the cross-linked copolymer to form the composition including the cross-linked polymer with absorbed hydrogen fluoride.

5. The method of claim 1, wherein the aqueous hydrogen fluoride comprises about 30 wt. % hydrogen fluoride or less based on the weight of water and hydrogen fluoride.

6. The method of claim 1, wherein the aqueous hydrogen fluoride comprises about 3 wt. % to about 12 wt. % hydrogen fluoride or less based on the weight of water and hydrogen fluoride.

7. The method of claim 1, further comprising:
pretreating the cross-linked copolymer with hydrogen fluoride by contacting the cross-linked copolymer with hydrogen fluoride to absorb at least a portion of the hydrogen fluoride with the cross-linked copolymer and recovering at least a portion of the absorbed hydrogen fluoride from the cross-linked copolymer; and
contacting pretreated cross-linked copolymer with aqueous hydrogen fluoride to form the composition including a cross-linked polymer with absorbed hydrogen fluoride.

8. The method of claim 1, wherein at least 80 wt. % of the absorbed hydrogen fluoride is released from the composition in said contacting step.

9. The method of claim 1, further comprising removing the cross-linked polymer from the aqueous hydrogen fluoride and contacting the cross-linked polymer with hydrogen fluoride to provide a second composition including the cross-linked polymer with absorbed hydrogen fluoride.

10. The method of claim 9, further comprising contacting the second composition with water to release at least a portion of the hydrogen fluoride from the second composition to the water to form aqueous hydrogen fluoride.

11. The method of claim 10, wherein at least 80 wt. % of the absorbed hydrogen fluoride is released from the second composition in said contacting the second composition with water step.

12. The method of claim 1, wherein the acrylamide units are polyacrylamide units.

13. The method of claim 1, wherein the acrylate acid salt is selected from the group consisting of potassium acrylate, sodium acrylate, and ammonium acrylate.

14. The method of claim 1, wherein the acrylate acid salt is potassium acrylate.

15. The method of claim 1, wherein the cross-linked polymer is a cross-linked acrylamide/potassium acrylate copolymer.

16. The method of claim 1, wherein the copolymer has a weight average molecular weight of about 5,000 to about 5,000,000 Daltons.

17. The method of claim 1, wherein the composition is in the form of a solid or a gel.

18. The method of claim 1, further comprising etching a siliceous substrate with the aqueous hydrogen fluoride.

19. The method of claim 1, wherein said contacting the composition with water to release at least a portion of the hydrogen fluoride is conducted at a temperature greater than about 5° C.

20. The method of claim 1, wherein said contacting the composition with water to release at least a portion of the hydrogen fluoride is conducted at a temperature of about 40° C. or greater.

* * * * *